United States Patent
Faros et al.

(10) Patent No.: US 7,869,602 B1
(45) Date of Patent: Jan. 11, 2011

(54) USER-BASED DIGITAL RIGHTS MANAGEMENT

(75) Inventors: Brian C. Faros, Raymore, MO (US); Scott Papineau, Shawnee Mission, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1223 days.

(21) Appl. No.: 11/121,522

(22) Filed: May 4, 2005

Related U.S. Application Data

(60) Provisional application No. 60/660,288, filed on Mar. 10, 2005.

(51) Int. Cl.
*H04L 9/00* (2006.01)
(52) U.S. Cl. .................. 380/277; 380/200; 380/201; 380/286; 455/410
(58) Field of Classification Search .......... 380/277, 380/270
See application file for complete search history.

(56) References Cited

U.S. PATENT DOCUMENTS

| | | | |
|---|---|---|---|
| 6,934,463 B2 | 8/2005 | Ishiguro et al. | |
| 7,421,411 B2 * | 9/2008 | Kontio et al. | 705/52 |
| 2002/0157002 A1 * | 10/2002 | Messerges et al. | 713/155 |
| 2003/0120940 A1 | 6/2003 | Vataja | |
| 2003/0233329 A1 | 12/2003 | Laraki et al. | |
| 2004/0139027 A1 * | 7/2004 | Molaro | 705/59 |
| 2004/0158707 A1 * | 8/2004 | Kim | 713/153 |
| 2005/0076210 A1 | 4/2005 | Thomas et al. | |
| 2006/0253713 A1 * | 11/2006 | Terranova et al. | 713/194 |
| 2007/0150735 A1 | 6/2007 | Futa et al. | |

OTHER PUBLICATIONS

U.S. Appl. No. 11/248,689, filed Oct. 12, 2005.
Office Action from U.S. Appl. No. 11/248,689, dated Dec. 17, 2008.
Office Action from U.S. Appl. No. 11/248,689, dated Aug. 10, 2009.

\* cited by examiner

*Primary Examiner*—Nasser Moazzami
*Assistant Examiner*—Fikremariam Yalew

(57) ABSTRACT

A content management system includes a mobile station, a service provider, and a content distribution kiosk. A content encryption key is associated with the mobile station, and a copy of the key is provided to the mobile station. In providing content to the mobile station, the content is first encrypted with the content encryption key, and it is sent to the mobile station in its encrypted form. The mobile station keeps the content in memory in its encrypted form. To make use of the content, the mobile station decrypts the content for use, and deletes the decrypted content once it has been used. The content in its encrypted form remains in memory on the mobile station. Multiple mobile devices may use the same content encryption key, in which case the devices may exchange encrypted content using, for example, a Bluetooth connection. Content may also be retrieved from a content distribution kiosk.

6 Claims, 3 Drawing Sheets

USER-BASED DIGITAL RIGHTS MANAGEMENT

BACKGROUND

This invention relates to a digital content management system that may be implemented in a mobile station, such as a mobile telephone.

Digital content providers often wish to limit the distribution of they content they provide. In some instances, these limitations may help to preserve the value of the content by restricting the distribution of unlicensed copies. In other cases, these limitations can manage the distribution of proprietary materials, such as software programs developed for use within a particular company. No one scheme of content management has been found to be appropriate in all circumstances. Mobile telephones, with their portability and connectivity, pose particular challenges for managing the distribution of content. As a result, it is desirable to develop a system content management system particularly geared toward use with mobile stations, such as mobile telephones.

Digital content can be supplied to mobile stations through a process known as provisioning. Mobile communications service providers (such as providers of mobile telephone service) can use provisioning to supply content—including applications and user profile information—to a user's mobile station. "Over-the-air" provisioning, in particular, allows users to set up a mobile station and to receive content through the mobile station's wireless interface. Over-the-air provisioning allows the user of a mobile station to acquire content without (for example) connecting the mobile station to a computer via a USB cable or other wired connection. Over-the-air provisioning is described in, for example, the WAP (Wireless Application Protocol) 2.0 Specification.

SUMMARY

A content management system includes a mobile station, a service provider, and a content distribution kiosk. A content encryption key is associated with the mobile station, and a copy of the key is provided to the mobile station. In providing content to the mobile station, the content is first encrypted with the content encryption key, and it is sent to the mobile station in its encrypted form. The mobile station keeps the content in memory in its encrypted form. To make use of the content, the mobile station decrypts the content for use, and deletes the decrypted content once it has been used. The content in its encrypted form remains in memory on the mobile station.

In this system, the content encryption key may be provided to the mobile station by the service provider during an over-the-air provisioning operation. The encrypted content may be provided to the mobile station by other mobile stations, or by the content distribution kiosk. The kiosk obtains the content encryption key associated with the mobile device, and it encrypts the content with the key before sending it to the mobile device.

DETAILED DESCRIPTION

I. Overview of a Preferred Embodiment

Figure 1:
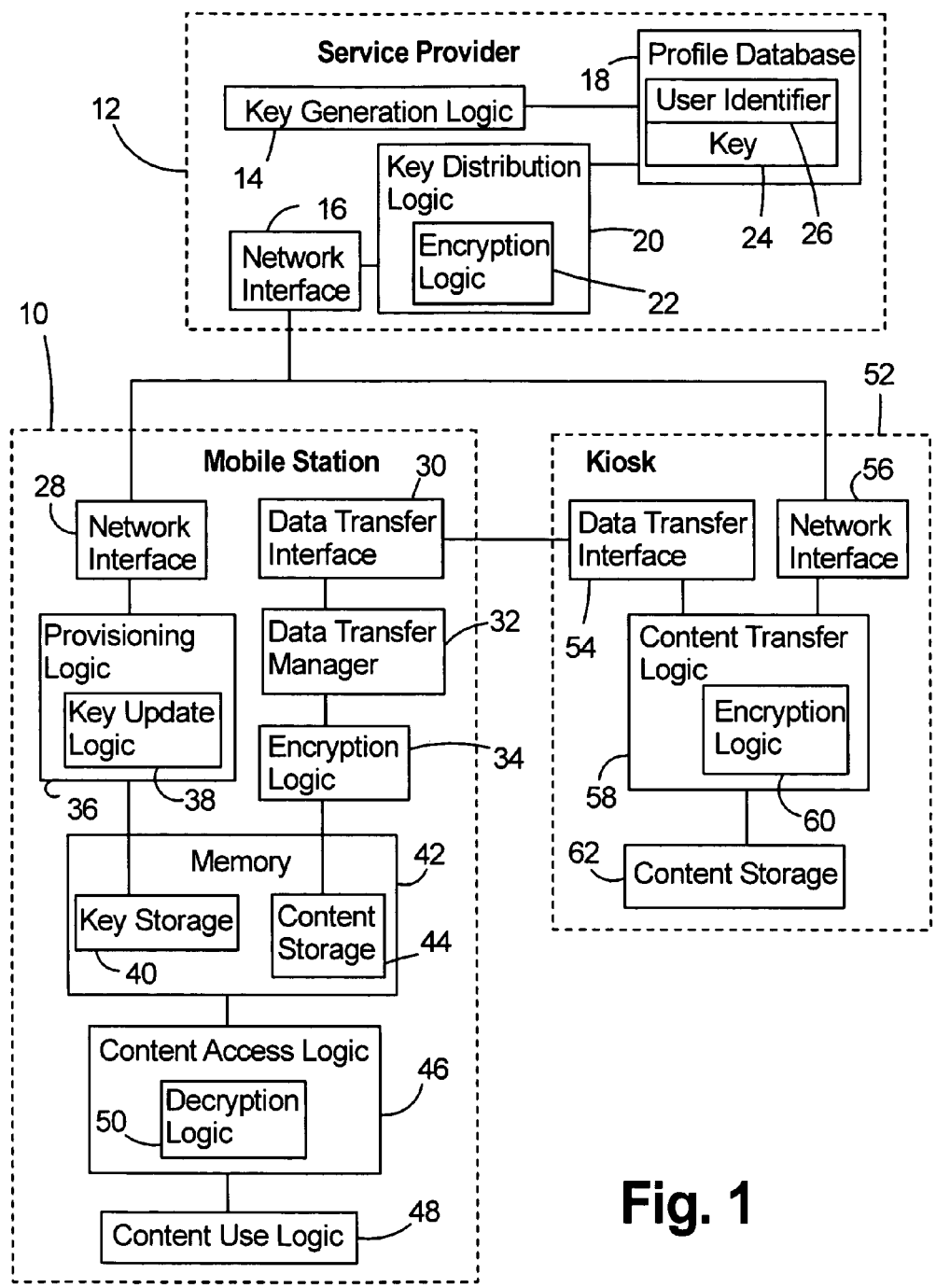
FIG. 1 is a schematic block diagram illustrating the functional architecture of a content management system.

One embodiment of a digital content management system is implemented in a system of several mobile stations, together with a telecommunications service provider that provides communications services to those mobile stations. The mobile stations may be, for example, mobile telephones.

The service provider assigns a content encryption key to each mobile station. The service provider stores one copy of the content encryption key, and it provides another copy of that key to the associated mobile station.

When the service provider sends content to the mobile station, it encrypts all or part of the content using the mobile station's content encryption key. The mobile station stores the content in its encrypted form. To make use of the content, the mobile station decrypts the content using the content encryption key. Between uses, the content remains in its encrypted form on the mobile station. (As used herein, the term "encrypted" refers to content that has been encrypted in part or in its entirety.)

Because the content is stored in its encrypted form, the content is not useful to a different device that does not have a copy of the content encryption key. This discourages the unlicensed transfer of content from one mobile station to another. If, however, the transfer of content from one mobile station to another is permitted, the latter station may be supplied with the content encryption key. For example, the service provider may store a single content encryption key associated with a user account. If the user adds new devices to the same account, the service provider sends the content encryption key to each new device. Then, the user may transfer (over a Bluetooth connection, for example) content in its encrypted form from to the new device, and the new device can make use of the content.

A. An Exemplary Service Provider

A service provider used in the implementation of the digital content management system may be a mobile telecommunications service provider. The service provider operates a profile database, which stores a user profile for each user account. With each of these user profiles, the service provider associates a content encryption key. When a new user profile is created (as when a new user opens an account), the service provider generates a new content encryption key for that account.

After a new user account has been created and a content encryption key has been assigned to the account, the service provider sends the encryption key to the user's mobile station. The key is preferably sent in the course of over-the-air provisioning of the mobile station. The service provider may encrypt the content encryption key itself for transmission, using, for example, a public key of the user. Alternatively, the protocol for over-the-air provisioning may itself provide sufficient security for the transmission of the content encryption key. The service provider can provide the content encryption key to the user over a wireless CDMA network, for example.

B. The Content Encryption Key

The content encryption key may take one of several different forms. The key is preferably a symmetric key, but it may be an asymmetric key pair. If the key is an asymmetric key pair, the service provider provides the mobile station with the private key and maintains copies of both the private key and the public key. In this way, the service provider can supply the private key to new devices that use the same content encryption key (such as when an account holder upgrades mobile stations), and the service provider uses the public key to encrypt content sent to the user's mobile station.

The key is preferably unique to the user profile. However, it is not necessary to guarantee the uniqueness of the key. If identical keys are sufficiently dispersed, and their value is not revealed to users, it is unlikely that users attempting an unlicensed transfer of encrypted content would be successful.

The length of the content encryption key is preferably sufficient such that the difficulty of defeating the encryption would at least be commensurate with the cost and/or difficulty of obtaining a licensed copy of the encrypted content. For example, in a system in which the encrypted content consists primarily of simple content, such as ring tones or screen savers, the encryption key may be relatively short. In a system involving more elaborate content, such as application software, the key may be longer. In one embodiment, the key is a 128 bit key seeded with a random number. The key may be generated by the service provider, or by the mobile station itself.

Different encryption algorithms may be employed in different embodiments. For example, block cipher algorithms such as AES, 3DES, Blowfish, or others may be used.

C. An Exemplary Mobile Station

The digital content management system is preferably embodied by a system in which the content is being distributed to mobile stations, such as users' mobile telephones. These mobile stations are capable of receiving content and content encryption keys.

A mobile station used in the system includes at least one network interface to communicate with the service provider. Over this network interface, the mobile station can receive the content encryption key and the content itself. The mobile station also includes data storage to store the encrypted content.

To make use of the content, the mobile station is provided with content use logic. The format of the content use logic may vary for different types of content. For example, where the content is an MP3 audio file, the content use logic includes MP3 decoding software. Where the content is an application software program, the content use logic may include an operating system and/or an interpreter.

To limit access to encrypted content, the mobile station is provided with content access logic. The content access logic decrypts the encrypted content, using the key provided by the service provider, so that the content use logic can make use of the decrypted content. The content access logic may itself be a module of the content use logic. The content access logic need not decrypt the entirety of the content for the content use logic; rather, it can decrypt portions of the content as they are needed. The content access logic can delete any decrypted portions of the content that remain after the content has been removed, while retaining the encrypted content in memory.

The content use logic and the content access logic may be implemented in hardware or in software. In one embodiment, the content access logic is implemented in hardware to make it less susceptible to reverse-engineering or tampering, which could lead to surreptitious decryption and copying of encrypted content. In this embodiment, the content use logic may still be implemented in software, or it may be implemented in hardware like the content access logic.

Because the content access logic makes use of the content encryption key, the mobile station includes key data storage that is accessible to the content access logic. Preferably, the key data storage is not directly accessible to users, who otherwise could transfer the key to other devices for the unlicensed use of content.

As noted above, the mobile station operates to receive the key from the service provider during over-the-air provisioning. To effect this transfer, the mobile station includes provisioning logic that communicates through the network interface, and key update logic that manages the writing and, if necessary, updating of the content encryption key to the key data storage. The key update logic may be a part of the provisioning logic, or it may be a separate module. In some embodiments, the key update logic may store the key itself in an encrypted form.

One optional feature of a mobile station is a second interface, in addition to the network interface used to communicate with the service provider. The second interface, referred to herein as a data transfer interface, can provide another route for downloading encrypted content. In one embodiment, the network interface is a CDMA wireless interface, while the data transfer interface is a Bluetooth wireless interface. The short-range connection capability of the Bluetooth interface can be useful to connect mobile stations with content sources other than the service provider. Such other sources may include, for example, a personal computer, or a Bluetooth-equipped kiosk that acts as a "vending machine" for content. The operation of such a kiosk is described below.

D. An Exemplary Content-Vending Kiosk

Content may be supplied to a mobile station through a kiosk. In such a scenario, the user of a mobile station initiates communications between the mobile station and the kiosk, over a Bluetooth connection, for example. The user selects content, such as one or more audio files, to purchase at the kiosk. The kiosk contacts the service provider to obtain the mobile station's content encryption key, and the kiosk then encrypts the content with that encryption key. The kiosk sends the encrypted content to the mobile station, and the mobile station can make use of the content by decrypting the content with its own local encryption key.

Such a kiosk for use in the digital content management system includes a network interface and a data transfer interface. The network interface communicates with the service provider, and the data transfer interface communicates with users' mobile stations.

II. A Digital Content Management System

One embodiment of a system for digital content management is illustrated in FIG. 1. The system includes one or more mobile stations 10 and a service provider 12. The system may also be operated with one or more kiosks 52. The service provider 12 generates a content encryption key for each mobile station 10. A mobile station 10 receive the content encryption key and encrypted content, and it uses the key to decrypt and make use of the content. The encrypted content may be sent to the mobile station 10 by, for example, the service provider 12, a kiosk 52, or a different mobile station, among other sources.

A. The Mobile Station

The mobile station 10 is made up of several modules. A network interface 28 enables communication with the service provider 12, while a data transfer interface 30 enables communication with other devices, such as a kiosk 52 or other mobile stations. As examples, the network interface 28 may be a wireless CDMA (code-division multiple access) interface, while the data transfer interface 30 may be, for example, a Bluetooth interface. In some embodiments, a single interface may be used to perform the functions of both the network interface 28 and the data transfer interface 30. In one embodiment, the mobile station is a mobile telephone.

The mobile station is provided with provisioning logic 36 to manage over-the-air provisioning with the service provider 12. If the mobile station is to receive a content encryption key during the provisioning process, the provisioning logic is provided with key update logic 38. The mobile station further has a memory 42. A content encryption key associated with the key mobile station is stored in a key storage portion 40 of the memory 42. The memory 42 may also used to store the encrypted content 44. In some embodiments, the key storage 40 and the content storage 44 may be in different memory devices. For example, the key may be stored in the electronic file system (EFS) of the mobile station, while the content is stored elsewhere in mobile station, including in a removable memory card.

In an embodiment in which the mobile station receives content through the data transfer interface 30, such a transfer of data is effected by a data transfer manager 32. Content received through the data transfer interface is stored in the memory 42. In some embodiments, content that is being transferred to the mobile station in an unencrypted form may be encrypted by the mobile station itself before it is stored. In such embodiments, the mobile station is provided with encryption logic 34 to encrypt that content.

To make use of the encrypted content, the mobile station is provided with content use logic 48, which may take a variety of forms, depending on the type of content. If, for example, the content is an audio file, such as an MP3 file, the content use logic may be a media player such as an MP3 player. If, in another example, the content is a software program, the mobile station may include interpreter software and/or operating system software to execute the program. A single mobile station may include different types of content use logic to handle different types of content.

Access to the content is governed by content access logic 46 in the mobile station. The content access logic ensures that encrypted content can be accessed only if the mobile station has been provided with a proper key. To perform this function, the content access logic 46 is provided with decryption logic 50. The decryption logic 50 uses the key to decrypt all or part of the content and makes the decrypted content available to the content use logic 48. In some embodiments, the content use logic and content access logic may be parts of a single software program. The content access logic may also operate to delete decrypted portions of the content after they are no longer needed by the content use logic, while retaining the encrypted content in storage.

B. The Exemplary Service Provider

The service provider 12 may be embodied in a variety of ways. In particular, in one embodiment, the service provider 12 is a mobile telecommunications service provider, which provides voice and data services to the mobile station 10 over a CDMA or other wireless network through its network interface 16. The service provider includes a profile database 18, which includes account information relating to users who have an account with the service provider. At the time a user opens an account with the service provider, or at some time thereafter, key generation logic 14 generates a content encryption key associated with the account. Although the structure of the profile database 18 may vary in different embodiments, an exemplary embodiment associates a user identifier 26 with a content encryption key 24. Such an identifier is referred to herein as a "user identifier" even if it identifies an account, rather than a particular individual user (who may have more than one account.)

After a key has been generated and associated with a user, the service provider sends the key to the user's mobile station. Key distribution logic 20 is responsible for this operation. The key distribution logic 20 may be implemented as a portion of a system used for over-the-air provisioning of the mobile station. For added security, the key distribution logic may be provided with encryption logic 22, such that the content encryption key is itself encrypted as it is sent to the mobile station.

C. The Content Distribution Kiosk

The mobile station 10 may receive content from other devices, such as from the kiosk 52. The kiosk 52 may be embodied as a content vending machine, positioned in a public location such as a shopping mall or a music store. The kiosk 52 includes a data transfer interface 54 for communicating with mobile stations. This data transfer interface may be, for example, a Bluetooth interface. The kiosk may transfer to the mobile station content that is stored internally in the kiosk, in a content storage area 62, or it may transfer content that the kiosk obtains over a network.

The content transfer process is managed by content transfer logic 58 in the kiosk. In one embodiment, this process proceeds as follows. The mobile station initiates communications with the kiosk 52 over their respective data transfer interfaces 30, 54. The communications between the mobile station and the kiosk may include, for example, a selection of particular content, and exchange of information for payment for the content. The kiosk then contacts the service provider through the kiosk's network interface 56 to obtain the content encryption key associated with the mobile station. In requesting the content encryption key, the kiosk provides to the service provider an identifier associated with the mobile station, which may be a user identifier, an account identifier, or a telephone number, to name a few examples.

After it receives the key from the service provider, the kiosk encrypts the content with the content encryption key, using encryption logic 60, and it sends the encrypted content to the mobile station from the data transfer interface 54. The mobile station may then store the encrypted content in the content storage portion 44 of its memory 42.

III. A Digital Content Management Method

Figure 2:
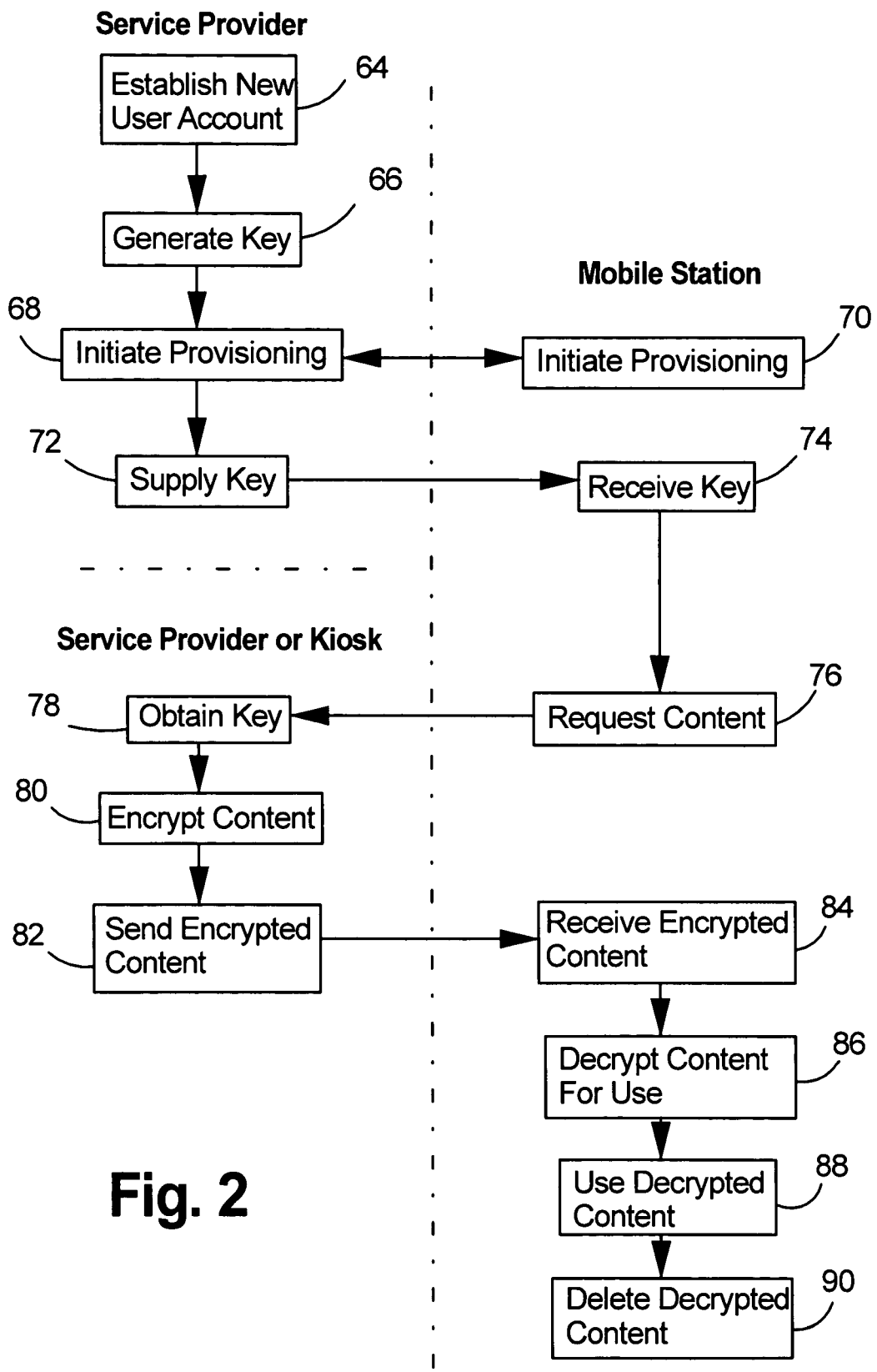
FIG. 2 is a schematic flow diagram showing one method that can be performed using a content management system.

An exemplary method of operating the content management system is illustrated in FIG. 2. The method in FIG. 2 illustrates the steps that may take place when a user first acquires a mobile station to be used with the system. The user establishes a new account with a service provider in step 64. In step 66, the service provider generates a content encryption key for that account. In steps 68 and 70, the mobile station and the service provider initiate over-the-air provisioning, during which, in step 72, the service provider sends the key to the mobile station. The mobile station receives the key in step 74.

At some later time after receiving the key, the mobile station requests content in step 76. This request may be made of, for example, the service provider or a content distribution kiosk. Upon receiving the request, the service provider or kiosk retrieves the key (from a local database or through a network-based request) in step 78. Once it has retrieved the key, the service provider or kiosk encrypts the content in step 80, and in step 82 it sends the content to the mobile station.

In step 84, the mobile station receives and stores the content in its encrypted form. When the mobile station goes to use the content, it uses its own copy of the content encryption key to decrypt all or part of the content in step 86. In its decrypted form, the content may be used by the mobile station in step 88. After it has been used, the content in its decrypted form may be deleted from the mobile station, so that the content is stored only in its encrypted form on the mobile station.

Figure 3:
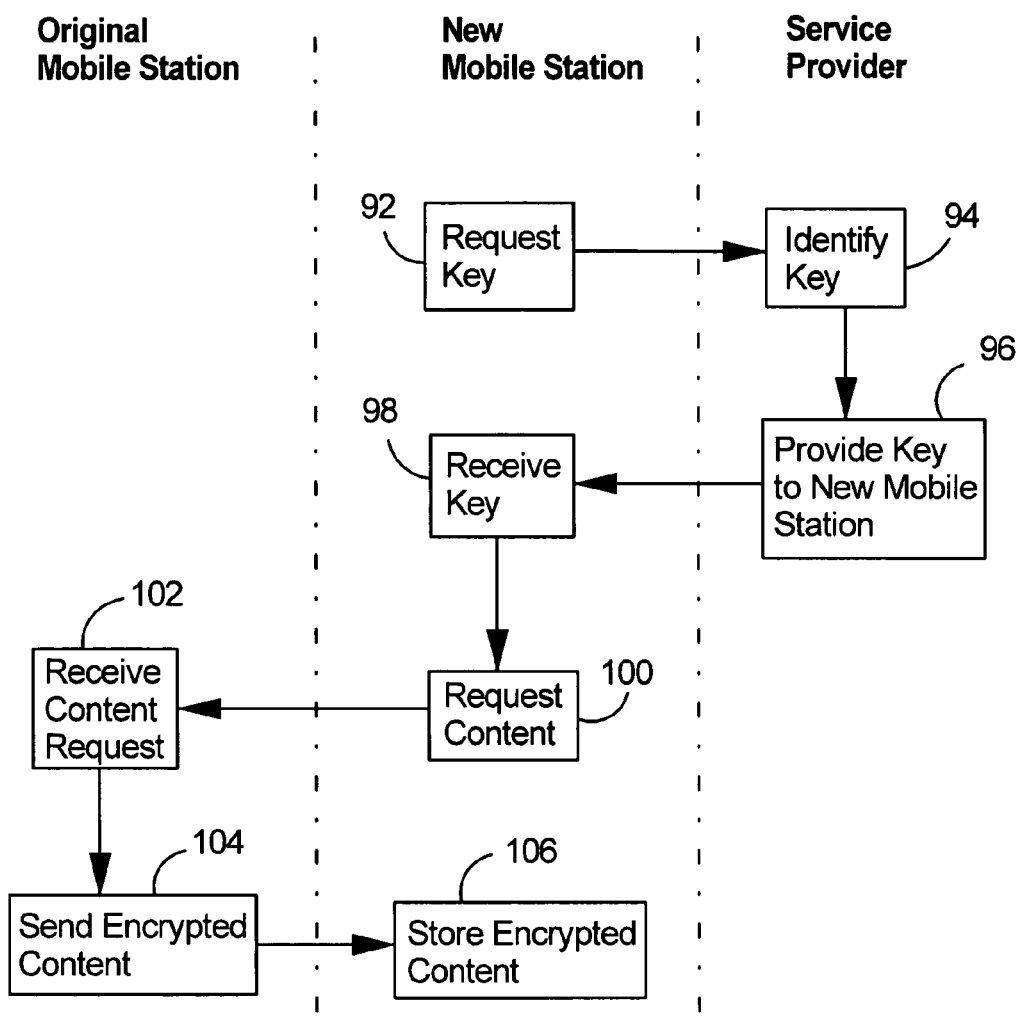
FIG. 3 is a schematic flow diagram showing another method that can be performed using a content management system.

Another method that may be implemented using the content management system is illustrated in FIG. 3. FIG. 3 shows steps that may be performed to transfer content between mobile stations that are associated with the same account. In particular, the figure shows the transfer of content from a user's "original mobile station" to the user's "new mobile station," such as may take place after a user has purchased a replacement or an extra mobile station.

In step 92, the new mobile station requests the content encryption key associated with the user. In step 94, the service provider identifies the key and, in step 96, it provides that key to the new mobile station. In step 98, the new mobile station receives the key. The new mobile station requests content from the original mobile station in step 100. In step 102, the original mobile station receives the request and, in step 104, it sends the content, in its encrypted form, to the new mobile station.

As seen in the steps of FIG. 3, it is not necessary to decrypt and re-encrypt content being transferred among mobile stations associated with the same account. Rather, the content may simply be transferred in its encrypted form. Because both mobile stations use the same content encryption key, they can both make use of the content. Moreover, it should be noted that the new mobile station may receive the content in its encrypted form even before it receives the content encryption key. The mobile station could transfer the content to other devices, but not use the content itself, until it received the key.

IV. Alternative Embodiments

Certain implementations of the invention have been described above, but various others likewise fall within the scope of the present invention. As an example, the mobile station may be embodies as, among other things, a mobile telephone, a mobile and/or car-mounted MP3 player, or a personal computer. The network interfaces of the mobile station and the service provider can communicate over different types of networks, such as the Internet or a private CDMA network.

The logical modules of the system, such as the provisioning logic, the content access logic, and the content use logic, may be implemented in hardware, in software, or in a combination of hardware and software. Where a module is implemented in software, a processor is provided, and the system keeps computer-readable instructions in a storage medium, such as a RAM or a ROM medium. The instructions direct the processor to carry out the operations described herein, and the processor operates to carry out the instructions.

The systems and methods described herein illustrate particular embodiments of the invention. The invention is not limited to these embodiments, but rather is defined by the following claims.

The invention claimed is:

1. A content management method comprising:
   receiving into a first mobile station from a mobile telecommunications service provider, during over-the-air provisioning of the first mobile station, an encryption key associated with a user account under which the first mobile station is to be served by the mobile telecommunications service provider;
   storing the encryption key in the first mobile station;
   thereafter sending from the first mobile station to the mobile telecommunications service provider a request for content, and receiving into the first mobile station from the mobile telecommunications service provider the requested content, wherein the received content is encrypted by the mobile telecommunications service provider with the content encryption key in response to the request for the content;
   applying the encryption key in the first mobile station to decrypt only a portion of the received encrypted content so as to produce decrypted content, and using the decrypted content in the first mobile station;
   deleting the decrypted content from the first mobile station after use of the decrypted content in the first mobile station; and
   retaining the encrypted content in the first mobile station after deleting the decrypted content in the first mobile station.

2. The content management method of claim 1, further comprising:
   storing the encryption key at the mobile telecommunications service provider in a profile record associated with the user account.

3. The content management method of claim 1, further comprising:
   during the over-the-air provisioning of the first mobile station, transmitting the encryption key from the mobile telecommunications service provider to the first mobile station.

4. The content management method of claim 1, further comprising:
   transferring the received encrypted content from the first mobile station to a second mobile station that is also served by the mobile telecommunications service provider under the user account and that also received from the mobile telecommunications service provider, and stored, the encryption key associated with the user account, the second mobile station being operable to apply the encryption key to decrypt the encrypted content so as to produce the decrypted content as well and to use the decrypted content as well.

5. The content management method of claim 4, further comprising:
   during over-the-air provisioning of the second mobile station, transmitting the encryption key from the mobile telecommunications service provider to the second mobile station.

6. The content management method of claim 4, further comprising:
   applying the encryption key in the second mobile station to decrypt the encrypted content received from the first mobile station, and using the decrypted content in the second mobile station.

\* \* \* \* \*